(12) United States Patent
Suchy et al.

(10) Patent No.: US 9,652,210 B2
(45) Date of Patent: May 16, 2017

(54) PROVISIONING A DEVICE WITH MULTIPLE BIT-SIZE VERSIONS OF A SOFTWARE COMPONENT

(75) Inventors: Miroslav Suchy, Brno (CZ); Milan Zazrivec, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 1386 days.

(21) Appl. No.: 11/897,193

(22) Filed: Aug. 28, 2007

(65) Prior Publication Data

US 2009/0064133 A1 Mar. 5, 2009

(51) Int. Cl.
G06F 9/455 (2006.01)
G06F 15/173 (2006.01)
G06F 9/445 (2006.01)

(52) U.S. Cl.
CPC ............ G06F 8/60 (2013.01); G06F 9/44505 (2013.01)

(58) Field of Classification Search
CPC .... G06F 8/60; G06F 9/44505; G06F 9/45533; G06F 9/45558; G06F 21/6218; G06F 8/54

See application file for complete search history.

(56) References Cited

U.S. PATENT DOCUMENTS

| | | | |
|---|---|---|---|
| 5,420,992 A | 5/1995 | Killian et al. | |
| 5,740,461 A | 4/1998 | Jaggar | |
| 5,802,359 A | 9/1998 | Webb et al. | |
| 5,826,074 A | 10/1998 | Blomgren | |
| 5,958,037 A * | 9/1999 | Dreyer et al. | 712/32 |
| 6,021,484 A * | 2/2000 | Park | 712/41 |
| 6,163,764 A | 12/2000 | Dulong et al. | |
| 6,402,028 B1 * | 6/2002 | Graham et al. | 235/380 |
| 6,662,361 B1 | 12/2003 | Jackson | |
| 6,725,366 B1 | 4/2004 | Swanberg | |
| 6,728,864 B2 | 4/2004 | Lee et al. | |
| 6,836,657 B2 * | 12/2004 | Ji et al. | 455/419 |
| 6,889,376 B1 | 5/2005 | Barritz et al. | |
| 6,922,831 B1 | 7/2005 | Kroening et al. | |
| 7,249,247 B2 | 7/2007 | See et al. | |

(Continued)

OTHER PUBLICATIONS

Eilam, et al., "Managing the Configuration Complexity of Distributed Applications in Internet Data Centers", IEEE Communications Magazine, Mar. 2006, [retrieved on May 23, 2011]. Retrieved from Internet <URL:http:/ieeexplore.ieee.org/xpls/abs-all.jsp?amumber=1607881&tag=1>; pp. 166-177.*

(Continued)

Primary Examiner — Thuy Dao
(74) Attorney, Agent, or Firm — Lowenstein Sandler LLP

(57) ABSTRACT

A provisioning system to automatically determine the appropriate components to install or make available for installation on a target computer system. The provisioning system ensures the provisioning of software components that are appropriate to each target computer system without requiring user input. The provisioning system can identify support for 64-bit software components. The provisioning system checks a field in the processor to determine longword, that is 64-bit support, or checks an entry in a file maintained by an operating system to determine 64 bit support. If 64-bit support is not detected then a 32-bit component is installed to ensure that the target computer system is capable of executing the software component.

15 Claims, 5 Drawing Sheets

(56) References Cited

U.S. PATENT DOCUMENTS

| | | | |
|---|---|---|---|
| 7,260,702 B2 | 8/2007 | Vega et al. | |
| 7,350,207 B2 | 3/2008 | Fisher | |
| 7,380,039 B2* | 5/2008 | Miloushev et al. | 710/244 |
| 7,424,719 B2 | 9/2008 | Duplichan | |
| 7,451,298 B2 | 11/2008 | Peak et al. | |
| 7,478,178 B2 | 1/2009 | Torudbakken et al. | |
| 7,574,706 B2* | 8/2009 | Meulemans et al. | 717/174 |
| 7,577,722 B1* | 8/2009 | Khandekar | G06F 9/45558 709/220 |
| 7,600,005 B2* | 10/2009 | Jamkhedkar et al. | 709/220 |
| 7,613,864 B2 | 11/2009 | Torudbakken et al. | |
| 7,765,287 B2* | 7/2010 | Pravat et al. | 709/223 |
| 7,836,121 B2 | 11/2010 | Elgressy et al. | |
| 7,912,955 B1* | 3/2011 | Machiraju et al. | 709/226 |
| 8,255,362 B2* | 8/2012 | Johnson et al. | 707/625 |
| 8,255,363 B2* | 8/2012 | Johnson et al. | 707/638 |
| 8,725,886 B1* | 5/2014 | Pulier | H04L 47/822 709/217 |
| 8,972,746 B2* | 3/2015 | Johnson | G06F 21/6218 713/189 |
| 9,319,337 B2* | 4/2016 | Koponen | G05B 11/01 |
| 9,319,338 B2* | 4/2016 | Padmanabhan | G05B 11/01 |
| 9,411,534 B2* | 8/2016 | Lakshman | G06F 3/065 |
| 2002/0052727 A1 | 5/2002 | Bond et al. | |
| 2002/0082818 A1 | 6/2002 | Ferguson et al. | |
| 2002/0082819 A1 | 6/2002 | Ferguson et al. | |
| 2002/0082820 A1 | 6/2002 | Ferguson et al. | |
| 2002/0082821 A1 | 6/2002 | Ferguson et al. | |
| 2002/0082858 A1 | 6/2002 | Heddaya et al. | |
| 2002/0083146 A1 | 6/2002 | Ferguson et al. | |
| 2002/0107954 A1 | 8/2002 | Ferguson et al. | |
| 2002/0112219 A1* | 8/2002 | El-Ghoroury | 716/7 |
| 2002/0156874 A1 | 10/2002 | Suorsa et al. | |
| 2002/0156894 A1 | 10/2002 | Suorsa et al. | |
| 2002/0158900 A1 | 10/2002 | Hsieh et al. | |
| 2003/0022657 A1 | 1/2003 | Herschberg et al. | |
| 2003/0037327 A1* | 2/2003 | Cicciarelli et al. | 717/178 |
| 2003/0088684 A1 | 5/2003 | Fisher | |
| 2003/0221190 A1* | 11/2003 | Deshpande | G06F 8/61 717/171 |
| 2004/0093595 A1 | 5/2004 | Bilange | |
| 2004/0128651 A1 | 7/2004 | Lau | |
| 2004/0136327 A1 | 7/2004 | Sitaraman et al. | |
| 2004/0226010 A1 | 11/2004 | Suorsa | |
| 2005/0004974 A1* | 1/2005 | Sharma et al. | 709/202 |
| 2005/0027846 A1* | 2/2005 | Wolfe et al. | 709/223 |
| 2005/0049906 A1 | 3/2005 | Leymann et al. | |
| 2005/0097082 A1 | 5/2005 | Yan | |
| 2005/0102129 A1 | 5/2005 | Bond et al. | |
| 2005/0125768 A1 | 6/2005 | Wong et al. | |
| 2005/0172112 A1 | 8/2005 | Yu et al. | |
| 2005/0172282 A1 | 8/2005 | Shenfield et al. | |
| 2005/0198629 A1 | 9/2005 | Vishwanath | |
| 2006/0004884 A1 | 1/2006 | Kling et al. | |
| 2006/0005200 A1 | 1/2006 | Vega et al. | |
| 2006/0026602 A1* | 2/2006 | Duplichan | 719/321 |
| 2006/0069753 A1* | 3/2006 | Hu et al. | 709/220 |
| 2006/0179431 A1* | 8/2006 | Devanathan et al. | 717/168 |
| 2006/0200816 A1* | 9/2006 | Pramanick | G01R 31/31907 717/170 |
| 2006/0206890 A1 | 9/2006 | Shenfield et al. | |
| 2006/0242352 A1 | 10/2006 | Torudbakken et al. | |
| 2006/0253619 A1 | 11/2006 | Torudbakken et al. | |
| 2006/0265446 A1 | 11/2006 | Elgressy et al. | |
| 2007/0088630 A1* | 4/2007 | MacLeod et al. | 705/28 |
| 2007/0198819 A1 | 8/2007 | Dickens et al. | |
| 2007/0214453 A1 | 9/2007 | Dive-Reclus | |
| 2008/0034194 A1 | 2/2008 | Peak et al. | |
| 2008/0163227 A1* | 7/2008 | Son et al. | 718/102 |
| 2008/0229274 A1 | 9/2008 | Cancenco et al. | |
| 2008/0313594 A1 | 12/2008 | Smith | |
| 2009/0064133 A1* | 3/2009 | Suchy | G06F 8/60 717/177 |
| 2010/0235433 A1* | 9/2010 | Ansari et al. | 709/203 |
| 2015/0269085 A1* | 9/2015 | Gainey, Jr. | G06F 9/45533 714/53 |

OTHER PUBLICATIONS

MSDN, "Gettting the system Version", Microsoft developer network, publish date unknown, [retrieved on May 23, 2011]. Retrieved from Internet <URL:http://msdn.microsoft.com/en-us/library/ms724429(d=printer,v=vs.85).aspx; pp. 1-12.*

Intel, "INtel LANDesk Client Manager 3.3 Administrator's Guide", 1998, Intel Corporation; [retrieved on May 31, 2011]; Retrieved from Internet <URL:http://drivers.rekvizit.ru/Net/Intel/IntelDisk/Idcm/LDCM_UG.PDF>;pp. 1-122.*

Lucas, et al., "Ex parte Samir Shah, Binh Truong, and Ram Gupta", BPAI decision on U.S. Appl. No. 10/229,851, 2008; [retrieved on May 13, 2013]; Retrieved from Internet <URL:http://e-foia.uspto.gov/Foia/ReterivePdf?system=BPAI&fINm=fd20080648-08-18-2008-1>;pp. 1-9.*

Langou et al., Exploiting the performance of 32 bit floating point arithmetic in obtaining 64 bit accuracy (revisiting iterative refinement for linear systems), Nov. 2006, 17 pages.*

"git://git.fedorahosted.org/snake/commitdiff", Will Woods, Aug. 22, 2007, 2 pages.

Office Action for U.S. Appl. No. 11/897,071 mailed Nov. 9, 2011.

MSDN, "GetSystemInfo Function" Microsoft Developer Network Feb. 10, 2011 <http://msdn.microsoft.com/en-us/library/ms724381(v=vs.85).aspx> all pages.

MSDN, "System_INFO Structure" Microsoft Developer Network Feb. 10, 2011 <http://msdn.microsoft.com/en-us/library/ms724340(v=vs.85).aspx> all pages.

Robert Reif "Robert Reif: kernal32: Add GetNativeSystemInfo" WineHQ Tue Aug. 15, 2006 <http://www.winehq.org/pipermail/wine-cvs/2006-August/025433.html>all pages.

Office Action for U.S. Appl. No. 11/897,071 mailed Apr. 12, 2011.

USPTO, Advisory Action for U.S. Appl. No. 11/897,071 mailed Jan. 26, 2012.

USPTO, Office Action for U.S. Appl. No. 11/897,071 mailed May 6, 2013.

USPTO Final Office Action for U.S. Appl. No. 11/897,071 mailed Sep. 23, 2013.

USPTO Advisory Action for U.S. Appl. No. 11/897,071 mailed Dec. 20, 2013.

USPTO Office Action for U.S. Appl. No. 11/897,071 mailed Jan. 15, 2014.

Srikanth Sundarrajan, "Xen and Server Consolidation," Infosys, 2006, <http://www.cs.ucf.edu/~subh/docs/pubs/Infosys-Whitepaper_Xen-Server-consolidation_May-06.pdf>, pp. 1-10.

C. Ray Peng et al., "The PowerPC ArchitectureTM: 64-Bit Power with 32-Bit Compatibility," IEEE, 1995, <http://ieeexplore.ieee.org/stamp/stamp.jsp?tp=&arnumber=512400>, pp. 1-8.

John Mashey, "The Long road to 64 Bits," ACM Queue, 2006, <http://delivery.acm.org/10.1145/117000/1165766/p24-mashey.pdf>, pp. 1-12.

USPTO, Notice of Allowance for U.S. Appl. No. 11/897,071 mailed Apr. 23, 2014.

* cited by examiner

PROVISIONING A DEVICE WITH MULTIPLE BIT-SIZE VERSIONS OF A SOFTWARE COMPONENT

CROSS-REFERENCE TO RELATED APPLICATION

Cross-reference is made co-pending U.S. patent application Ser. No. 11/897,071, filed Aug. 28, 2008.

TECHNICAL FIELD

Embodiments of the invention relate to provisioning of software to computer systems. Specifically, the embodiments of the invention relate to selecting appropriate provisioning for target computer systems including making the appropriate software components available for 64-bit and 32-bit architectures.

BACKGROUND

Computer systems, such as the computer system illustrated in FIG. 1, include processors 1 designed for different types of architectures. A key aspect of these architectures is the standard size of registers 3, datapaths 11, address sizes, memory locations 5 and similar features of the computer system. While some computer architectures mix the use of different sizes amongst these elements 13, most computer systems utilize mostly or entirely one size. For example, many computer systems are designed with 32-bit or 64-bit architectures, where the addresses, datapath sizes and register sizes are uniformly 32-bit or 64 bits in size.

Software 7 is compiled and formatted for a specific architecture. Software compiled and designed for a 64-bit architecture cannot be executed by a computer system with a 32-bit architecture or mixed architectures with key elements being 32-bit. Values are compiled as 64-bit integers or similar 64-bit value types and instructions are specific to the 64-bit architecture. Some processors designed for 64-bit architectures can also execute programs designed for smaller architecture sizes, usually in a separate 32-bit mode. The ability of a 64-bit architecture to execute programs compiled as 64-bit or 32-bit programs is influenced by the operating system available to the computer system. A 32-bit operating system running on a 64-bit architecture with a 32-bit support mode may limit the system to executing 32-bit programs.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
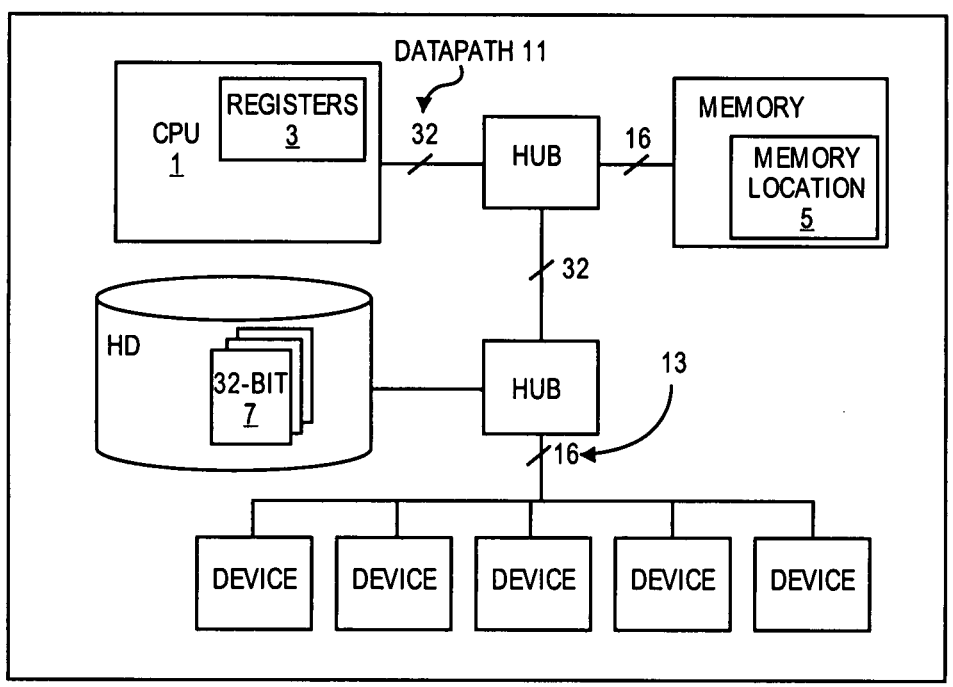
FIG. 1 is a diagram of one embodiment of a computer system architecture.

Described herein is a method and apparatus for a provisioning system to automatically determine the appropriate components to make available for installation on a target computer system. The method and apparatus ensure the provisioning of software components that are appropriate to each system without requiring user input to identify the features that determine which software components could be supported, including determining support for 64-bit software components. The method and apparatus check a field in the processor to determine longword support, that is 64-bit support, or check an entry in a file maintained by an operating system to determine 64-bit support. If 64-bit support is not detected then a 32-bit software component is installed to ensure that the target computer system is capable of executing the software component.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "checking," "installing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus can be specially constructed for the required purposes or it can comprise a general purpose computer or set of computers selectively activated or reconfigured by a computer program stored in the computer. Such a computer program may be stored in a computer-readable storage medium, such as, but not limited to, any type of disk including floppy disks, optical disks, compact disc read-only memories (CD-ROMs) and magnetic-optical disks, read-only memories (ROMs), random access memories (RAMs), electronically programmable read-only memories (EPROMs), electronically erasable programmable read-only memories (EEPROMs), magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes ROM, RAM, magnetic disk storage media, optical storage media, flash memory devices or other types of machine-accessible storage media.

In one embodiment, components of the provisioning management system are stored on a machine-accessible storage medium that may be a single medium. The term "machine-accessible storage medium" should be taken to include a single medium or multiple media (e.g., a centralized or distributed database, and/or associated caches and servers) that store one or more sets of instructions implementing the components. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories and optical and magnetic media.

Figure 2:
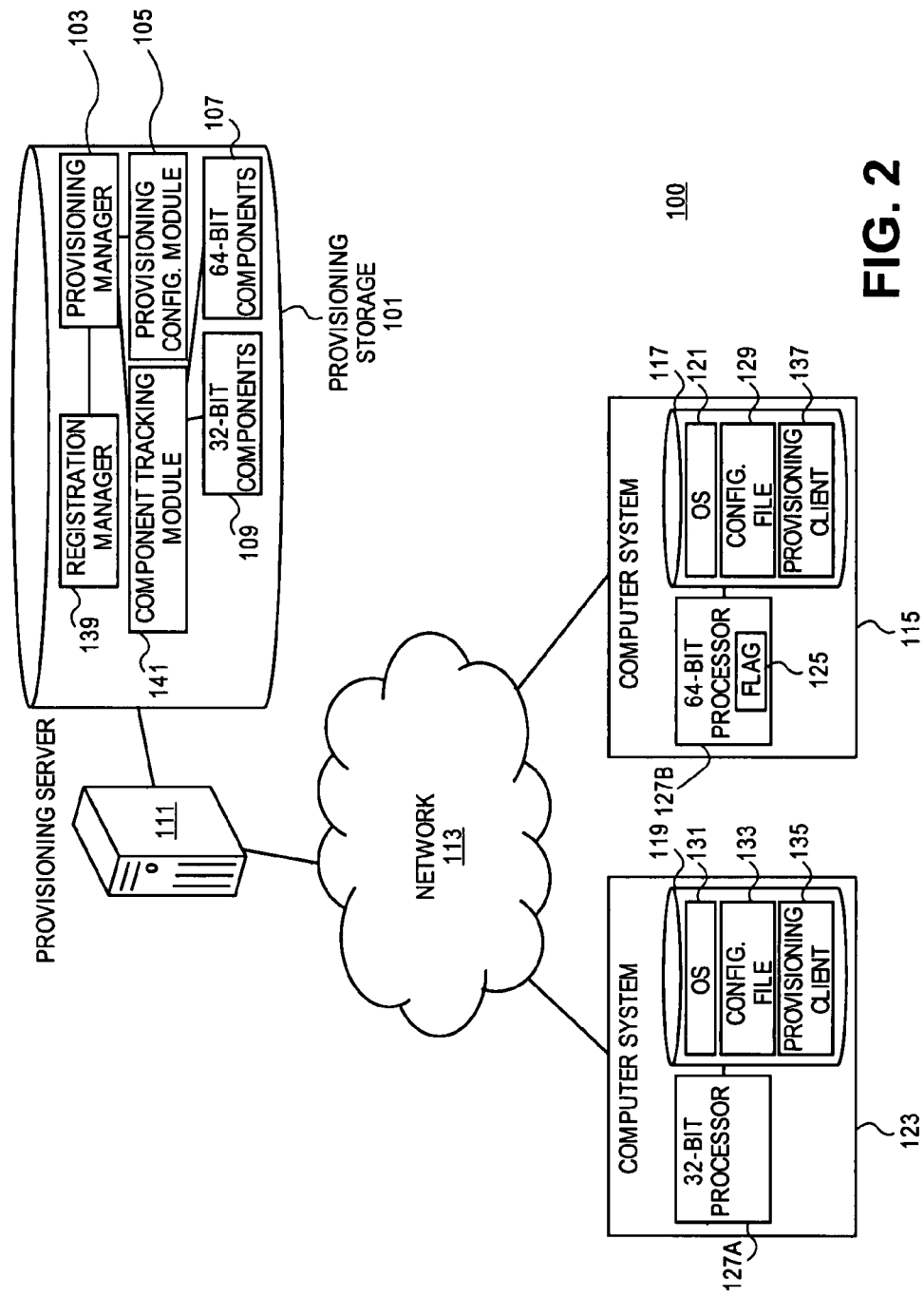
FIG. 2 is a diagram of one embodiment of a provisioning system.

FIG. 2 is a diagram of one embodiment of a provisioning system. The provisioning system 100 includes a provisioning server 111, provisioning storage device 101, network 113 and computer systems 115, 123. The provisioning system 100 can include any number of provisioning servers 111, provisioning storage devices 101 and connected computer systems 115, 123. The system in the diagram is an example embodiment that is a simplified description of the components and operating principles of the system. The details have been simplified for sake of clarity and to avoid obscuring the relevant features of the system. One skilled in the art would understand that these components and operating principles can be used in other contexts and in other and more complex combinations.

A provisioning server 111 is a server machine, workstation or similar computer system capable of communicating with other computers 115, 123 over a network 113. The provisioning server 111 facilitates the transfer of software components, which can include any type of programs, applications, operating system components or portions thereof or updates thereto, to target computer systems 115, 123. The provisioning server 111 manages the process of download of these files by computers 115, 123 that are registered with the provisioning server 111. The provisioning server 111 may also manage the registration of computers 115, 123 that receive provisioning data. The computers 115, 123 registered with the provisioning server 111 can download software components as they become available. The registered computer 115, 123 can periodically check for available software components or can receive notification of the availability of compatible software components from the provisioning server 111. This functionality can be distributed over a plurality of provisioning servers 111 or provided from a single provisioning server. The functionality of the provisioning server 111 can be implemented through a set of software components including a provisioning manager application 103, registration manager 139, provisioning configuration module 105, component tracking module 141 or similar components. These components along with the software components that are to be provisioned to the registered computers 115,123 can be stored in a provisioning storage device 101 or set of provisioning storage devices.

The network 113 is the medium for communication between the computers and devices of the provisioning system 100. The network 113 can be any type of network including a local area network (LAN), wide area network (WAN), such as the Internet, or similar type of network. Any communication protocol or combination of communication protocols can be utilized to facilitate the communication and transfer of data between the computers and devices of the provisioning system 100.

A provisioning storage device 101 can be any type of storage device including a magnetic medium (e.g., a hard drive), optical medium, solid state device (e.g., flash memory) or random access memory (RAM) or similar devices or combinations of such devices. Any number and organization of provisioning storage devices 101 can be utilized. In one embodiment, a portion or whole of the software components including the provisioning manager 103, provisioning configuration module 105, registration manager 139, component tracking module 141, software components available for provisioning 107, 109 and similar software components of the provisioning system 100 are stored in the provisioning storage device 101.

Any number or subset of these software components can be stored in a file system or database on the provisioning storage device 101. A database for storing these components can include a relational database, object-oriented database or similar type of database. In one example embodiment, the provisioning storage device 101 encompasses a file system that stores the provisioning manager 103, provisioning configuration module 105, component tracking module 141 and registration manager 139. Software components 107, 109 to be provisioned are stored in a database. The provisioning database stores different versions of software components for provisioning that are designed to operate on a specific set of architectures or architectures with specific features or capabilities. These characteristics may include bit-size, instruction set, virtual machine extension, processor type or manufacturer or similar architecture characteristics. In another embodiment, the different versions of the software components are stored in the file system.

A program or component may exist in a 32-bit version 109 and 64-bit version 107. The 32-bit version 109 and 64-bit version 107 are alternate builds of the same or similar programs, applications, updates or similar software. The provisioning manager 103 and provisioning server 111 can offer the different versions of components based on characteristics of the target computer including processor type, operating system, bit-size, platform or similar distinctions. The example of 32-bit and 64-bit architecture alternatives is used herein, but one skilled in the art would understand that the principles and features described herein could be applied to provisioning other sets of alternative component implementations and is used herein for sake of clarity. These principles can also be applied to accommodate other variations in architecture, such as 16-bit, 128-bit or other architectures, multiple operating systems, such as 64-bit Microsoft Windows operating systems or 32-bit Microsoft Windows operating systems and similar differences between computer systems.

The provisioning manager 103 is a component that analyzes collected provisioning configuration data in the provisioning configuration module 105 and determines a best fit or compatible software components for each registered computer system in the provisioning system 100. The selected software components are made available for download to the corresponding computer system. Examples of the methods for selecting the software components are described further herein below.

The provisioning configuration module 105 is a collection of records or profiles that store the configuration information of each computer system 115, 123 registered with the provisioning system. The configuration profiles managed by the provisioning configuration module 105 include data such as an architecture bit-size support indicator that designates the architecture bit-size for the associated computer system, virtual machine extension support, operating system indicator, processor type or manufacturer indicator and similar data regarding the associated computer systems.

The registration manager 139 is a component that services registration requests from computer systems 115, 123. The computer systems 115, 123 send registration requests to the registration manager 139, which collects configuration information about each computer system 115, 123 and stores it in the provisioning configuration module 105. An example of a method for handling a registration request is described further herein below.

A component tracking module 141 is a component that stores information about software components that are available for distribution to computer systems. The component tracking module 141 can store any feature or characteristic information about the available software components including bit-size of the programs, virtual machine extension requirements, processor support, instruction set support, operating system or platform requirements and similar information. This information can be stored in any format including a database or flat file format.

Any number of computer systems 115, 123 or other processing device may be present in the provisioning system 100. Each computer system 115, 123 may rely on a single provisioning server 111 or a set of available provisioning servers. A 'set,' as used herein, refers to any positive whole number of items including one. A processing device such as the example computer systems 115, 123 may be a desktop computer, laptop computer, server, console device, handheld device, networking device or similar device. Each computer system 115, 123 in the provisioning system has a specific architecture such as a 32-bit or 64-bit architecture. The architecture can be determined based on the type of processor in the computer system 115, 123. The processors 127A, 127B can include a flag 125 that can be read from the processor registers after calling a special processor instruction or is stored in a register or similar storage device in the processor 127B or computer system 115. Each computer system 115, 123 also includes a storage system 117, 119 such as hard drive to store an operating system 121, 131 and configuration files 129, 133 as well as other applications and programs. The storage system 117, 119 may be a magnetic, optical, flash or similar storage unit. The configuration file 129, 133 is maintained by the operating system 121, 131 and may, depending on the operating system, include an indicator of system support for 64-bit or 32-bit applications and programs. The operating system 121, 131 reports the type of architecture during the registration process of each the computer systems 115, 123 based on the flag 125 or configuration file 129, 133. In another embodiment, each computer system 115, 123 is queried by the provisioning server 111 at the time of registration, provisioning or at a similar time.

The presence of a flag 125 or similar indicator may be limited to certain architectures. For example, a 64-bit processor 125 is able to provide feature bits information, which include a longword flag that indicates that the processor can support 64-bit or 'longword' instruction or data. The absence of such a flag can be interpreted as indicating that a processor can only support 32-bit instructions and data. In other embodiments, any type of flag or other indicator may be used to indicate support for a given architecture and may be queried to determine the appropriate provisioning for the system.

In one embodiment, an operating system 121, 131 may handle the provisioning and registration of each computer system 115, 123. In other embodiments, a provisioning client 135, 137 may handle these functions independent from or in coordination with the operating system 121, 131. The provisioning client 135, 137 may be a component of the operating system 121, 131, a part of another component such as the basic input/output system of the computer or similar component, or an independent program operating at the application level or below. The provisioning client 135, 137 may handle the registration of the computer system including reporting the features and characteristics of the computer system that identify its architecture and/or manage or provide an interface for the management of the download of the software components appropriate for the respective computer system as determined by the provisioning server 111.

Figure 3:
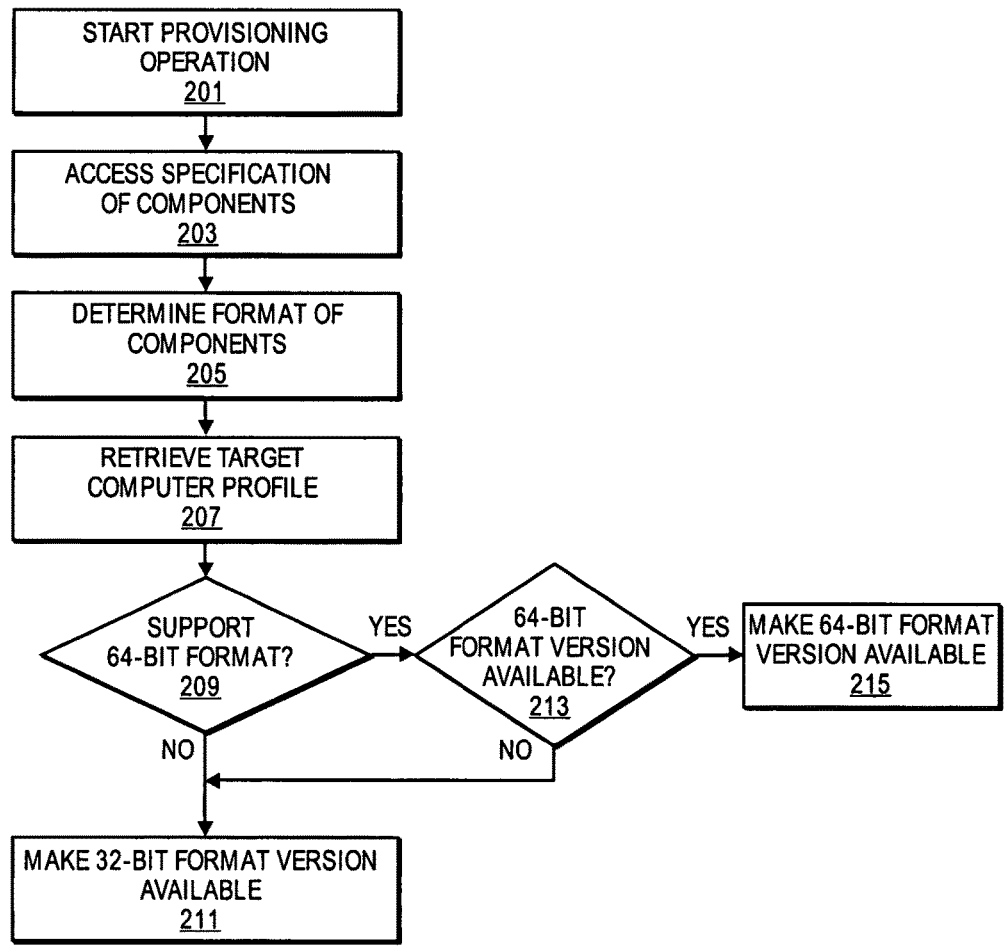
FIG. 3 is a flowchart of one embodiment of a process for a provisioning determination process.

FIG. 3 is a flowchart of one embodiment of a process for a provisioning determination operation. A provisioning determination operation can be initiated by a provisioning manager or provisioning client at any time in response to a scheduled provisioning, user or administrator initiation, availability of a new software component, registered computer system request or under similar conditions (block 201). The provisioning determination operation is executed by the provisioning manager on the provisioning server or by similar components of the provisioning server. The provisioning manager determines each of the computers to be updated and the software components or files to be supplied to each. The provisioning manager may receive this information as input through a file, user interface or similar mechanism. This data is referred to herein as the provisioning specification.

The provisioning manager accesses the provisioning specification to determine each of the computer systems to be provisioned in an iterative process or all of the computers if the process is partially or wholly executed in parallel (block 203). The provisioning specification details the software components to be distributed and criteria for distribution such as computer configuration information that a registered system is required to meet in order to receive the distribution. For example, if a new set of operating system components (component A and component B) are made available for provisioning, the provisioning specification indicates that component A is a 64-bit component to be installed only on computer systems with 64-bit architectures and component B is a 32-bit component to be installed on computer systems with 32-bit architectures or operating in a 32-bit mode. In another embodiment, each of the components to be distributed are analyzed to determine or confirm the format of the components as either 32-bit or 64-bit programs (block 205).

Each of the registered computer systems is then analyzed to determine, which of the components of the distribution are to be provisioned to each computer system (block 207). In another embodiment, the provisioning specification indicates the target computers for which provisioning is to be determined. A check is made for each computer to determine whether it supports 64-bit software components (block 209). If no 64-bit support is available for a target computer, then the 32-bit versions of each component designated for provisioning are made available to the target computer (block 211). In one embodiment, the provisioning process is a 'pull' process, where the registered computers query the provisioning server to determine the availability of new software components, the selection of which is constrained by the provisioning determination process. In another embodiment, the provisioning process is a 'push' process, where the provisioning server transfers the software components determined to be appropriate for each target computer upon determining that the target computer is available to received the software components.

If a target computer system is determined to support 64-bit software components, then a check is made for a 64-bit version of the software component (block 213). If the 64-bit support is present, but a 64-bit version of the component is not available then the 32-bit version may be provided to the target computer if the target computer supports or is operating in a 32-bit mode. In another embodiment, if the target computer does not support a 32-bit mode, then no software component is made available to the target computer. However, if a 64-bit version of the software component is available, then the 64-bit version is made available to the target computer (block 215). The target computer can retrieve the software component as part of a pull process or receive the software component in a push process.

Figure 4A:
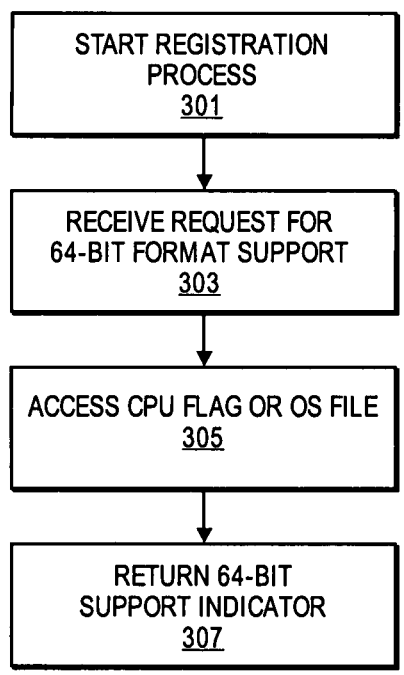
FIG. 4A is a flowchart of one embodiment of a process for registering of a computer system with the provisioning system.

FIG. 4A is a flowchart of one embodiment of a process for registering by a computer system. The registration process may be initiated by a computer system when set up on a network or similarly configured by an administrator, by a provisioning manager when a new computer is detected on a network, initiated by an administrator or other user through a provisioning client or through a similar process (block 301). The registration process illustrated is executed by provisioning client, operating system or similar program on a computer system. The registration process includes the sending of configuration information from a computer system to the provisioning server to be stored in the provisioning database. In one embodiment, the computer system receives a request during the registration process to determine architecture bit-size support, such as 64-bit format support (block 303). The provisioning client or similar application accesses the flag indicating longword support in a processor register or similar location. In processors manufactured by Intel Corporation of Santa Clara, Calif. or AMD of Sunnyvale, Calif. a flag commonly known as the "lm" or or longmode flag can be read from processor information and feature bits stored in processor registers after calling a special processor instruction and indicates support for 64-bit data and instructions. Similarly, some operating systems maintain configuration information indicating support for 64-bit processing. For example, in the Linux operating system, the/proc/cpufile includes configuration information indicating that 64-bit programs are supported by the computer system (block 305). Checking the configuration information of a processor or operating system is more efficient and reliable than attempting to parse a processor name or other descriptor information, which requires up to date and complete information about all processors to match this information with support for 64-bit processing.

The accessed architecture bit-size support indicator or similar information is then returned to the provisioning manager (block 307). In one example embodiment, 64-bit support information is transmitted to the provisioning manager as a reply to a query. In another embodiment, the provisioning client automatically collects and sends this information as part of the registration process without being queried. This registration process can occur during any state of the computer system, including the start up phase or standard operating phase.

In the registration process example provided, the registration process and provisioning client collect information about the architecture bit-size support, such as 64-bit support, of a computer system. Other information identifying an architecture or operating environment of a computer system can also be collected using similar techniques.

Figure 4B:
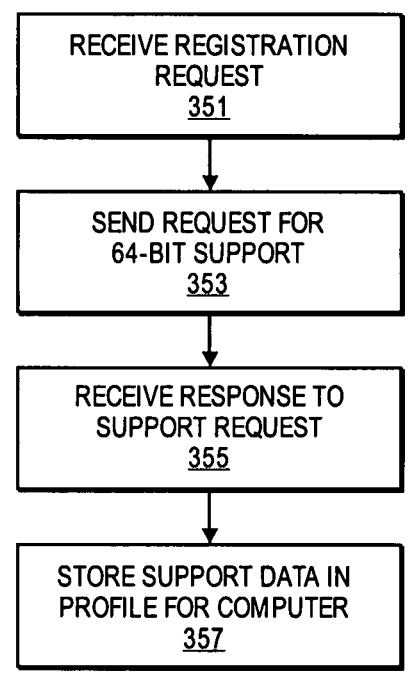
FIG. 4B is a flowchart of one embodiment of a process for managing a registration request by the provisioning registration manager of the provisioning system.

FIG. 4B is a flowchart of one embodiment of a process for managing a registration request. This process is executed by the provisioning manager in response to receiving a request for registration from a computer system (block 351). In another embodiment, this process may be initiated by the provisioning manager, which then processes the reply by the computer system. The registration request may be received via any communication protocol or medium. The initial request can include identification information regarding the requesting computer including a network address, system and configuration information, user names and similar information.

In response to the registration request, the provisioning manager queries the requesting computer for architecture bit-size support, such as 64-bit support (block 353). The provisioning manager may also query the computer system for other architecture and identification information that may be relevant to software provisioning. The computer system supplies the information regarding bit-size support to the provisioning manager as a bit-size support indicator (block 355). The reply information may be in any format and transmitted through any communication medium and protocol. In another embodiment, the computer system provides configuration information including bit-size support information without prompting or queries during the registration process. This supplied configuration information can be in any format and may be compressed or encrypted. The response data may be provided through a continuous session or through other communication mechanisms.

The received configuration information is then stored with other configuration information in a configuration profile specific to the computer system in the provisioning storage device (block 357). Configuration information may be stored in any format including within a database or file. Separate profiles or entries can be maintained for each computer system that registers with the provisioning server. If a group of provisioning servers are utilized, then the information can be shared or stored in a common storage system such as central database system or similar storage system.

The registration process may occur when a system is first connected to a provisioning system. The registration process or a similar update process can be executed to keep configuration information up to date after modifications are made to a computer system. Additional registrations or updates can be scheduled by a user or administrator or initiated through a provisioning client or similar software. Additional registration or updates can be triggered automatically by the addition of a new software component to the provisioning system or under similar conditions.

Figure 5:
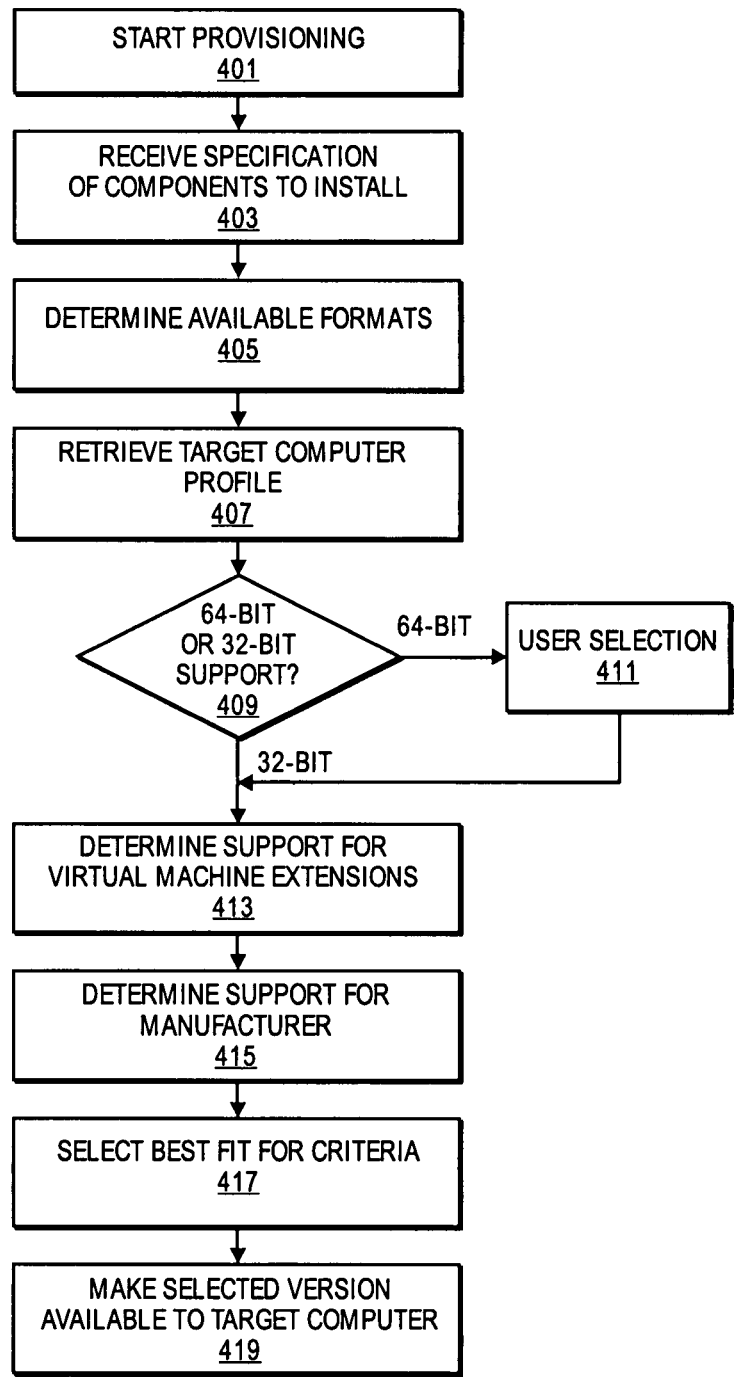
FIG. 5 is a diagram of one embodiment of a provisioning process that selects software components appropriate for a target computer.

FIG. 5 is a diagram of, one embodiment of a provisioning determination process that determines a best fit of available software components for each registered computer system. In one embodiment, the provisioning determination process is initiated by the provisioning client, provisioning manager, a user, system administrator or similar entity (block 401). In one example, the provisioning manager receives a provisioning specification from an administrator or similar entity indicating a set of software components to install on compatible registered computers (block 405). The provisioning specification details the software components to be distributed and criteria for distribution such as computer configuration information that a registered system is required to meet in order to receive the distribution.

The provisioning manager analyzes the provisioning specification and available files to determine available formats or versions of each component (block 405). In another embodiment, this information is provided in the provisioning specification and may be verified by the provisioning manager. The configuration profile for each of the target computers designated for provisioning is retrieved (block 407). The provisioning process for each computer may be an iterative process or aspects of the process may be done in parallel.

Each computer configuration is checked to determine the presence of specific architecture characteristics, support for modes of operation and similar configuration information. In one example embodiment, the provisioning manager checks for 64-bit or 32-bit support for executing programs (block 409). If a target computer system supports both formats, then a user can be queried to choose or confirm a choice of a particular format (block 411). In another embodiment, preferences of format may be utilized or a default selection may be made. For example, a default may select the largest bit-size format supported.

A check is then made of the configuration profile or a direct query to the destination computers is performed to determine support for virtual machine extensions (block 413). Virtual machine extension support can be determined by the target computer through checking a processor flag or operating system configuration file. This information can be collected and supplied during the registration process of the target machine. Virtual machine extension support indicates that the architecture of the target computer allows hardware support to be virtualized to allow multiple unmodified operating systems that are concurrently executing to utilize the same hardware resources by assigning separate virtual representations of each resource to the respective operating systems.

Support for a specific manufacturer of a processor or instruction set of a manufacturer can also be checked (block 415). The processor information can be obtained from flags in the central processing unit or from a configuration file maintained by the operating system. Stored processor information can be in the form of a processor name, model name or similar information. This data can also be collected during the registration process.

The provisioning manager analyzes the configuration information determined as set forth above and selects the components that best fit the configuration of each target computer (block 417). The best fit is determined by matching as many of the above discussed configuration criteria with characteristics of the available software components and ensuring compatibility of selected software components. For example, if a target computer has a 32-bit processor, WINDOWS XP® operating system, by Microsoft Corp of Redmond, Wash., and support for virtual machines, then a component that is 32-bit and compatible with Windows XP must be selected, but virtual machine support is not necessary and will be selected if available. The selected components are then made available to the computer system for installation (block 419). The target computer system can download the selected components or present them for review of a user of the computer system. Multiple compatible software components can be offered to the computer system with an indicator of those software components that best fit the system or a similar ranking or identification of software compatibility provided. In another embodiment, the selected software components are automatically transferred over a network or similar communication medium to the target computer to be installed. Criteria utilized to determine a best fit component may include bit-size support of the architecture, virtual machine extensions, instruction set support, processor manufacturer support and similar criteria.

Thus, a method and apparatus for managing provisioning based on a determination of longword or 64-bit architecture or similar architectures have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
    receiving, by a server device from a client device over a network, data indicative of a flag of a processing device of the client device in view of an operating system configuration file of the client device, the flag being indicative of a bit-size of the processing device and virtual machine extension support of the client device, wherein the bit-size of the processing device of the client device is a first bit-size;
    determining, by a processing device of the server device, that a version of a software component associated with the first bit-size and the virtual machine extension support is not available;
    provisioning a version of the software component associated with the virtual machine extension support and a second bit-size to the client device in view of the determination; and
    notifying the client device when the version of the software component associated with the first bit-size and the virtual machine extension support is available for installation, the notifying occurring after provisioning the version of the software component associated with the second bit-size.

2. The method of claim 1, wherein the first bit-size is 64-bit and the version of the software component associated with the second bit-size comprises a 32-bit version of at least one of an operating system, operating system component or application.

3. The method of claim 1, further comprising:
determining a version of the software component that meets a plurality of requirements of the client device, the requirements comprising bit-size, virtual machine extension support and instructions set support.

4. The method of claim 1, wherein provisioning the version of the software component comprises installing the version of the software component associated with the virtual machine extension support the second bit-size over the network.

5. The method of claim 1, wherein the data indicative of the bit-size of the processing device of the client device is received over at least one of a wide area network or a local area network.

6. The method of claim 1, further comprising: determining, by the server device, that the client device supports a mode associated with the second bit-size.

7. The method of claim 1, further comprising: querying a user device for a preferred bit-size version of the software component upon determining the processing device supports a plurality of bit-size versions of the software component.

8. A non-transitory computer-readable medium comprising instructions stored therein which when executed cause a processing device of a server device to:
receive, by the server device from a client device over a network, data indicative of a flag of a processing device of the client device in view of an operating system configuration file of the client device, the flag being indicative of a bit-size of the processing device and virtual machine extension support of the client device, wherein the bit-size of the processing device of the client device is a first bit-size;
determine, by the processing device of the server device, that a version of a software component associated with the first bit-size and the virtual machine extension support is not available;
provision a version of the software component associated with the virtual machine extension support and a second bit-size to the client device in view of the determination; and
notify the client device when the version of the software component associated with the first bit-size and the virtual machine extension support is available for installation, the notifying occurring after provisioning the version of the software component associated with the second bit-size.

9. The non-transitory computer-readable medium of claim 8, wherein the first bit-size is 64-bit and the version of the software component associated with the second bit-size comprises a 32-bit version of at least one of an operating system, operating system component or application.

10. The non-transitory computer-readable medium of claim 8, the server device further to:
determine a version of the software component that meets a plurality of requirements of the client device, the requirements comprising bit-size, virtual machine extension support and instructions set support.

11. The non-transitory computer-readable medium of claim 8, wherein provisioning the version of the software component comprises installing the software component over the network.

12. An apparatus comprising:
a memory; and
a first processing device operatively coupled to memory, the first processing device to:
receive, from a client device over a network, data indicative of a flag of a second processing device of the client device in view of an operating system configuration file of the client device, the flag being indicative of a bit-size of the second processing device and virtual machine extension support of the client device, wherein the bit-size of the second processing device of the client device is a first bit-size;
determine that a version of a software component associated with the first bit-size and the virtual machine extension support is unavailable;
provision a version of the software component associated with the virtual machine extension support and a second bit-size to the client device in view of the determination; and
notify the client device when the version of the software component associated with the first bit-size and the virtual machine extension support is available for installation, the notification occurring after provisioning the version of the software component associated with the second bit-size.

13. The apparatus of claim 12, wherein the first processing device is to select the software component based in part on virtual machine extension support and instruction set support.

14. The apparatus of claim 12, wherein the first processing device is to collect configuration data from the client device.

15. The apparatus of claim 12, wherein the first processing device is to store compatibility data for a plurality of versions of the software component.

* * * * *